United States Patent
Harris et al.

(10) Patent No.: US 10,641,313 B2
(45) Date of Patent: May 5, 2020

(54) SELF-ANTI-ROTATING DUAL LOCK WASHER

(71) Applicant: United Technologies Corporation, Farmington, CT (US)

(72) Inventors: Meggan H. Harris, Colchester, CT (US); James P. Allore, Manchester, CT (US); Jorge I. Farah, Hartford, CT (US); Stephanie Milbury, Meriden, CT (US)

(73) Assignee: United Technologies Corporation, Farmington, CT (US)

(*) Notice: Subject to any disclaimer, the term of this patent is extended or adjusted under 35 U.S.C. 154(b) by 84 days.

(21) Appl. No.: 15/925,812

(22) Filed: Mar. 20, 2018

(65) Prior Publication Data

US 2018/0209471 A1    Jul. 26, 2018

Related U.S. Application Data

(63) Continuation of application No. 13/600,734, filed on Aug. 31, 2012, now Pat. No. 9,945,411.

(51) Int. Cl.
    *F16B 39/10*            (2006.01)

(52) U.S. Cl.
    CPC .......... *F16B 39/108* (2013.01); *F16B 39/101* (2013.01); *Y10T 29/49908* (2015.01)

(58) Field of Classification Search
    CPC .......... F16B 39/01; F16B 39/02; F16B 39/10; F16B 39/101; F16B 39/108; F16B 39/24; Y10T 29/49908

See application file for complete search history.

(56) References Cited

U.S. PATENT DOCUMENTS

| | | | | |
|---|---|---|---|---|
| 656,152 A * | 8/1900 | Bartley | ................. | F16B 39/108 |
| | | | | 411/123 |
| 716,085 A * | 12/1902 | Nelson | ................. | F16B 39/101 |
| | | | | 411/98 |
| 762,107 A * | 6/1904 | Wilson | ................. | F16B 39/101 |
| | | | | 411/98 |
| 782,822 A * | 2/1905 | Bryan et al. | .......... | F16B 39/101 |
| | | | | 411/95 |
| 828,487 A * | 8/1906 | Konkle et al. | ........ | F16B 39/101 |
| | | | | 411/98 |
| 904,360 A | 11/1908 | Price | | |
| 972,086 A * | 10/1910 | Paterson | ............... | F16B 39/108 |
| | | | | 411/123 |
| 1,309,463 A * | 7/1919 | Crane | ................... | F16B 39/108 |
| | | | | 411/201 |
| 1,314,433 A * | 8/1919 | Sheets | ................... | F16B 39/108 |
| | | | | 411/201 |
| 1,634,744 A * | 7/1927 | Edwards | ................. | F16B 39/24 |
| | | | | 411/313 |

(Continued)

*Primary Examiner* — Christopher M Koehler
(74) *Attorney, Agent, or Firm* — Carlson, Gaskey & Olds, P.C.

(57) ABSTRACT

A disclosed lock washer includes a first opening spaced apart from a second opening for receiving fasteners and preventing rotation. A first set of tabs is associated with the first opening and a second set of tabs is associated with the second opening. Each of the first and second set of tabs are bendable to a lock position preventing rotation of a fastener received within a corresponding one of the first opening and the second opening.

16 Claims, 5 Drawing Sheets

(56) References Cited

U.S. PATENT DOCUMENTS

| | | | | |
|---|---|---|---|---|
| 1,657,949 | A * | 1/1928 | Wilson | F16B 39/108 411/123 |
| 1,685,120 | A * | 9/1928 | Carns | F16B 39/108 411/201 |
| 1,733,858 | A * | 10/1929 | Brandt | E01B 11/38 411/98 |
| 1,816,192 | A * | 7/1931 | Nagano | F16B 39/24 411/201 |
| 2,370,944 | A * | 3/1945 | Emerson | F16B 39/10 411/119 |
| 2,431,735 | A * | 12/1947 | Cyr | F16B 39/20 411/87 |
| 2,432,359 | A * | 12/1947 | Streid | F01D 25/18 60/39.08 |
| 2,674,844 | A * | 4/1954 | Boyd | F02K 1/04 60/771 |
| 2,836,959 | A * | 6/1958 | McDowall | F01D 9/042 60/797 |
| 3,926,237 | A | 12/1975 | Enders | |
| 4,478,551 | A * | 10/1984 | Honeycutt, Jr. | F01D 25/162 415/139 |
| 4,737,057 | A * | 4/1988 | Olsson | F16B 39/101 411/100 |
| 4,925,364 | A | 5/1990 | Das | |
| 5,022,875 | A * | 6/1991 | Karls | B63H 23/34 403/320 |
| 5,080,545 | A | 1/1992 | McKinlay | |
| 5,160,251 | A * | 11/1992 | Ciokajlo | F01D 25/162 415/142 |
| 5,489,174 | A * | 2/1996 | Lesson | F16B 39/20 403/212 |
| 5,562,378 | A | 10/1996 | Blechschmidt et al. | |
| 5,569,008 | A | 10/1996 | Chapkovich | |
| 6,322,306 | B1 * | 11/2001 | Dutton | F16B 2/245 411/120 |
| 6,884,025 | B2 | 4/2005 | Pickens et al. | |
| 6,976,817 | B1 | 12/2005 | Grainger | |
| 7,922,433 | B2 | 4/2011 | Ricciardo | |
| 2002/0110437 | A1 * | 8/2002 | Kirimoto | F16B 23/0061 411/119 |
| 2009/0103998 | A1 | 4/2009 | Gagneur | |
| 2011/0020091 | A1 * | 1/2011 | Larsen | F16B 27/00 411/84 |
| 2011/0027039 | A1 * | 2/2011 | Blair | B21D 53/20 411/149 |
| 2012/0195746 | A1 * | 8/2012 | Sarda | F01D 9/042 415/201 |
| 2012/0308327 | A1 * | 12/2012 | Goto | B62K 19/38 411/84 |
| 2013/0052003 | A1 * | 2/2013 | Rodriguez | F02C 7/04 415/208.2 |
| 2013/0052006 | A1 * | 2/2013 | Petty | F01D 25/24 415/213.1 |
| 2013/0094951 | A1 * | 4/2013 | McCaffrey | F01D 25/162 415/200 |
| 2015/0078855 | A1 * | 3/2015 | Prince | F16B 39/101 411/8 |
| 2015/0101174 | A1 * | 4/2015 | Williams | F16B 39/108 29/525.05 |

* cited by examiner

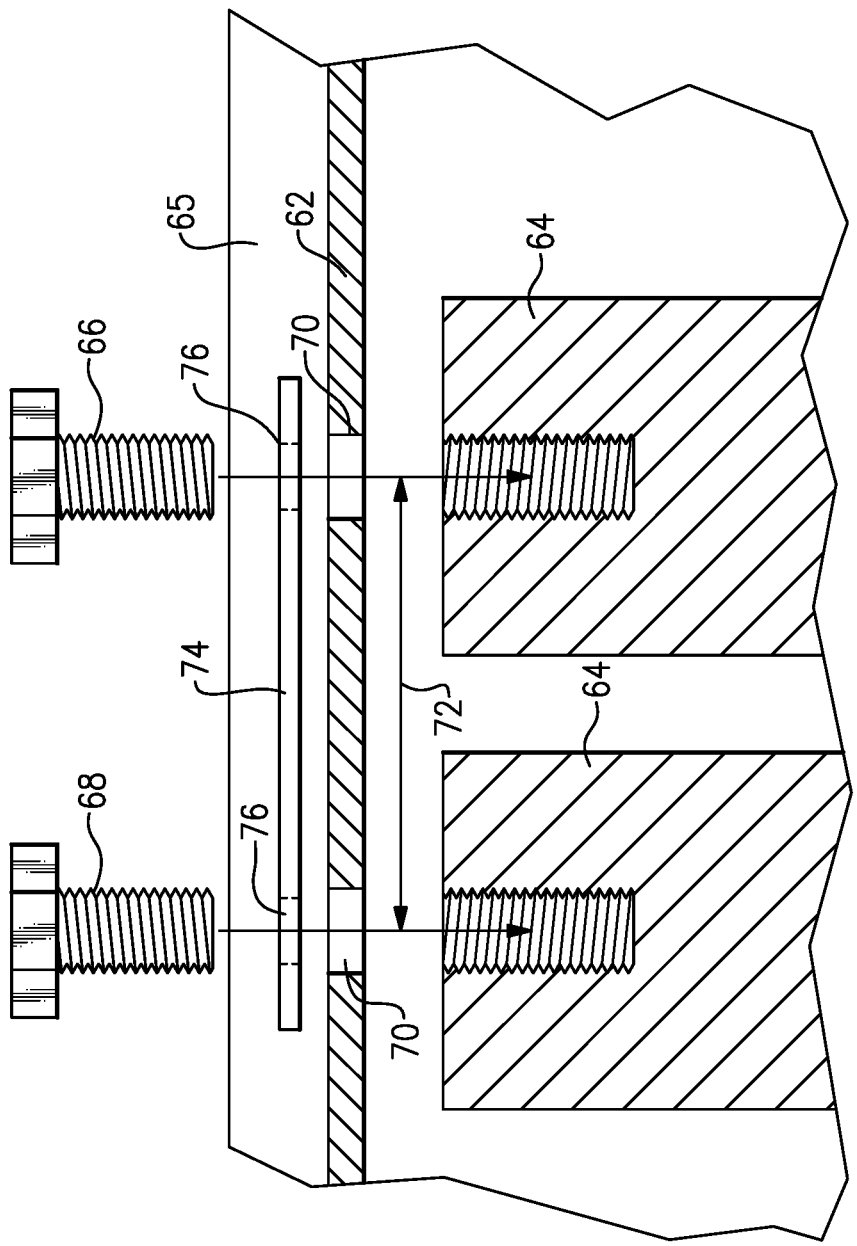

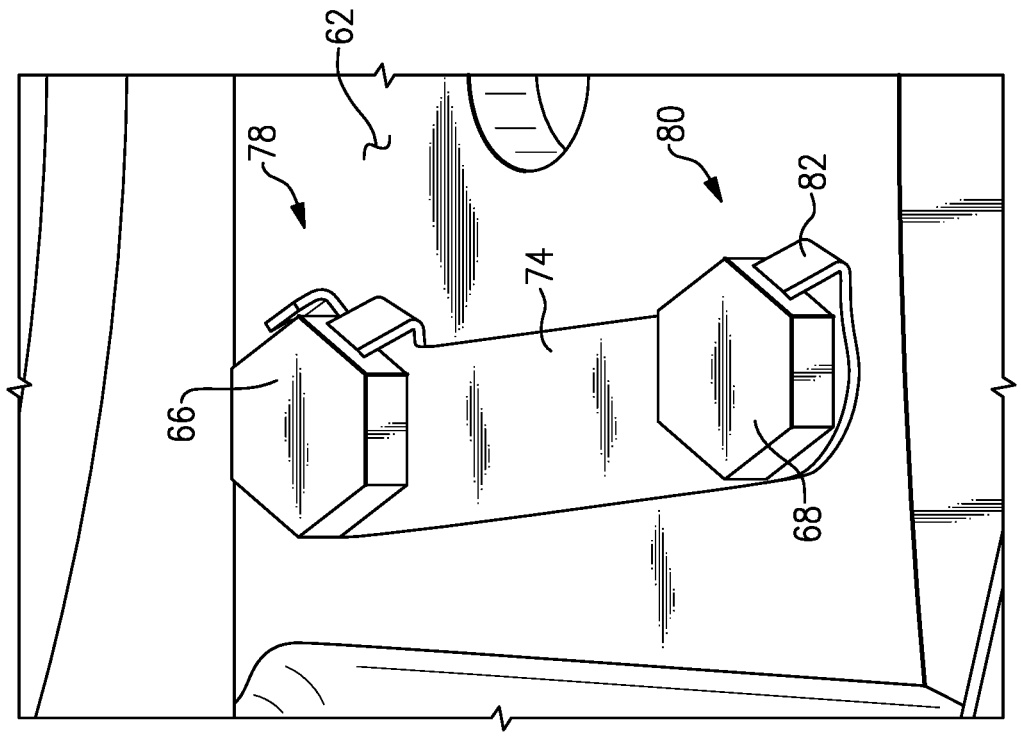
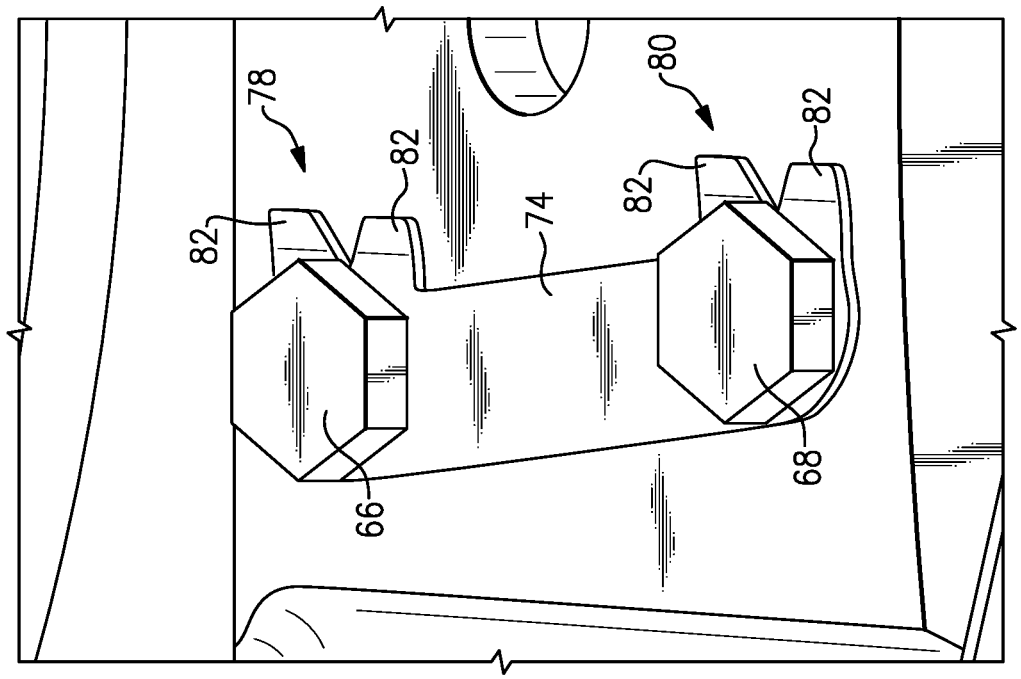

SELF-ANTI-ROTATING DUAL LOCK WASHER

CROSS REFERENCE TO RELATED APPLICATION

This application is a continuation of U.S. patent application Ser. No. 13/600,734 filed on Aug. 31, 2012.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Fasteners throughout the engine encounter extremes in temperatures, pressures and stresses. Moreover throughout the operating range of temperatures, pressures and vibratory stresses, the fasteners are required to maintain torque on the assembled components. Therefore fastener locking and anti-rotation features are included to maintain fasteners in the required assembled condition. However, such additional features can be cumbersome and limited in use due to available space and access around the fastener.

Accordingly, it is desirable to develop anti-rotation and locking features that maintain fastener integrity during extreme operational conditions that fit within available space restrictions.

SUMMARY

A lock washer according to an exemplary embodiment of this disclosure, among other possible things includes a first opening spaced apart from a second opening for receiving fasteners and preventing rotation of the lock washer. A first set of tabs is associated with the first opening, and a second set of tabs is associated with the second opening. Each of the first and second set of tabs are bendable to a lock position preventing rotation of a fastener received within a corresponding one of the first opening and the second opening.

In a further embodiment of the foregoing lock washer, each of the first set of tabs and the second set of tabs are disposed at a tab set angle that is non-normal to a back side that is opposite the first set of tabs and the second set of tabs.

In a further embodiment of any of the foregoing lock washers, each of the first set of tabs and the second set of tabs comprise two tabs with a tab angle defined between the two tabs.

In a further embodiment of any of the foregoing lock washers, includes a notch disposed between the two tabs of the first set of tabs and the second set of tabs.

In a further embodiment of any of the foregoing lock washers, the first set of tabs and the second set of tabs are parallel.

In a further embodiment of any of the foregoing lock washers, each of the first set of tabs and the second set of tabs are angled upwardly relative to a top surface of the lock washer.

A mid-turbine frame assembly according to an exemplary embodiment of this disclosure, among other possible things includes a case defining a first bolt hole and a second bolt hole spaced a first distance apart. A tie rod is secured relative to the case by a first bolt extending through the first bolt hole and a second bolt extending through the second bolt hole. A lock washer includes a first opening spaced apart from a second opening the first distance. A first set of tabs is associated with the first opening, and a second set of tabs is associated with the second opening. Each of the first and second set of tabs are bendable to a lock position preventing rotation of a fastener received within a corresponding one of the first opening and the second opening.

In a further embodiment of the foregoing mid-turbine frame assembly, each of the first set of tabs and the second set of tabs are disposed at a tab set angle that is non-normal to a back side that is opposite the first set of tabs and the second set of tabs.

In a further embodiment of any of the foregoing mid-turbine frame assemblies, each of the first set of tabs and the second set of tabs comprise two tabs with a tab angle defined between the two tabs.

In a further embodiment of any of the foregoing mid-turbine frame assemblies, including a notch disposed between the two tabs of the first set of tabs and the second set of tabs.

In a further embodiment of any of the foregoing mid-turbine frame assemblies, the first set of tabs and the second set of tabs are parallel.

In a further embodiment of any of the foregoing mid-turbine frame assemblies, each of the first set of tabs and the second set of tabs are angled upwardly relative to a top surface of the lock washer.

In a further embodiment of any of the foregoing mid-turbine frame assemblies, the first and second bolt holes are disposed adjacent a flange of the case. The lock washer includes an orientation. At least one of the first set of tabs and the second set of tabs engage the flange to mis-align one of the first and second openings with a corresponding one of the first and second bolt holes.

In a further embodiment of any of the foregoing mid-turbine frame assemblies, the engagement between the fasteners received through the first opening and the second opening of the lock washer prevent rotation of the lock washer relative to the case.

A method of locking a fastener according to an exemplary embodiment of this disclosure, among other possible things includes defining a first hole proximate a second hole, aligning one washer including first and second openings with the first and second holes, inserting a first fastener through the first opening in the washer and into the first hole, inserting a second fastener through the second opening in the washer and into the second hole, engagement between the first fastener and the second fastener and the first opening and the second opening of the washer prevent rotation of the washer, bending a first tab corresponding with the first opening to engage the first fastener, and bending a second tab corresponding with the second opening to engage the second fastener.

In a further embodiment of the foregoing method, the first and second holes are disposed proximate to a flange within a case and at least one orientation of the washer relative to the first and second holes and the flange mis-aligns the first and second openings relative to the first and second holes.

In a further embodiment of any of the foregoing methods, the washer includes a first set of tabs corresponding with the first opening and a second set of tabs corresponding with the second opening and including bending each of the first set of tabs to engage the first fastener and bending each of the second set of tabs to engage the second fastener to retain each of the first and second fasteners responsive to a loss of torque.

In a further embodiment of any of the foregoing methods, each of the first set of tabs and the second set of tabs are orientated along a non-normal angle relative to a back side of the washer.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is an exploded view of an example tie rod secured to a case structure.

FIG. 3 is a perspective view of an example washer assembled to the case.

FIG. 4 is a perspective of the example washer in a locking position.

DETAILED DESCRIPTION

Figure 1:
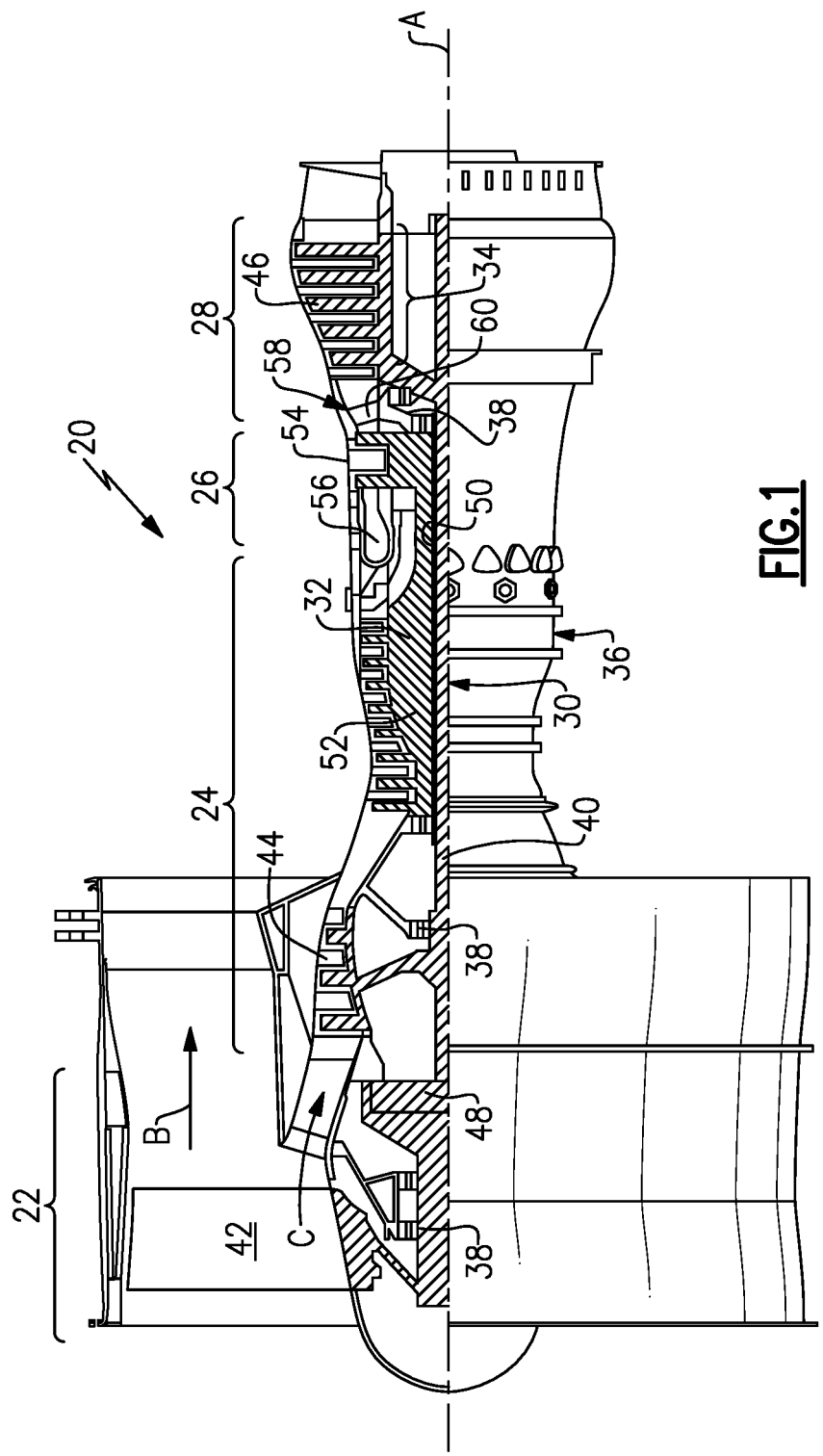
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Referring to FIG. 2, the example gas turbine engine includes a case 62 with openings 70. The openings 70 correspond and provide for bolts 68 and 66 to extend through the case 62. The bolts 66 and 68 are secured to corresponding tie rods 64. The example tie rods 64 are part of the mid turbine frame 58. The first bolt 68 and the second bolt 66 extend through a lock washer 74. The example lock washer 74 includes openings 76 that are spaced apart from each other and allow for both of the bolts 68 and 66 to extend through the common lock washer 74. Although in this disclosed example, the washer 74 and bolts 66, 68 secure tie rods 64 to a case 62, it is within the contemplation of this disclosure that the lock washer 72 can be utilized at many locations throughout the gas turbine engine 20.

Referring to FIG. 3 with continued reference to FIG. 2, the example bolts 66, 68 are shown assembled to the case 62 and through the lock washer 74. The example lock washer 74 includes a first tab set 78 and second tab set 80 that correspond to each of the bolts 66 and 68. Each of the tab sets 78, 80 include individual tabs 82 that are bendable upward to engage the corresponding bolt 66, 68 and prevent that bolt from rotating relative to the case 62 and the lock washer 74.

Referring to FIG. 4, the example lock washer 74 is shown with the tabs 82 bend upward into a locking condition. Each of the first tab set 78 and the second tab set 80 include two tabs 82 that can be bent upward to engage at least two sides of the corresponding bolts 66 and 68. In this manner, the tabs 82 prevent rotation of the bolt 68 relative to the case 62. Moreover, because the washer 74 extends between two bolts 66 and 68; the washer 74 may not rotate relative to the case 62. This provides a desired self-anti-rotation feature for the lock washer 74.

Figure 5:
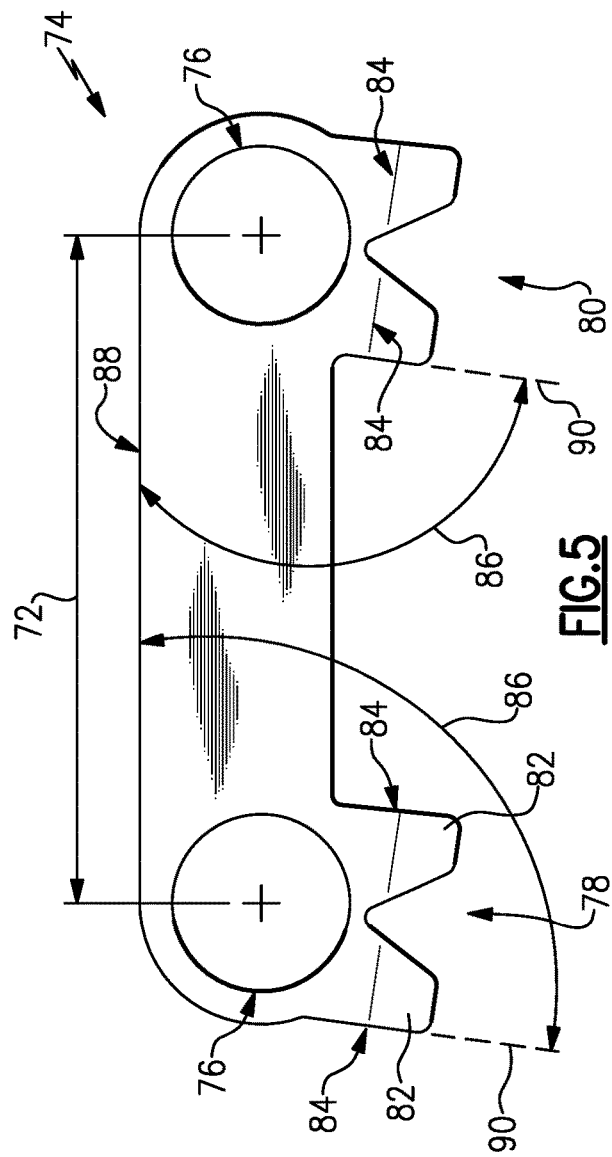
FIG. 5 is a top view of the example lock washer.
Figure 7:
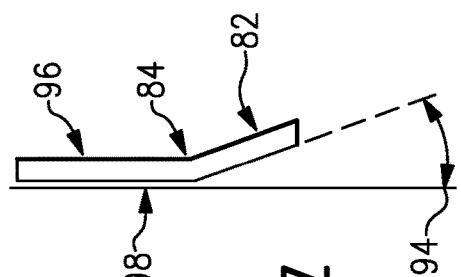
FIG. 7 is a partial side view of a tab set of the example lock washer.
Figure 6:
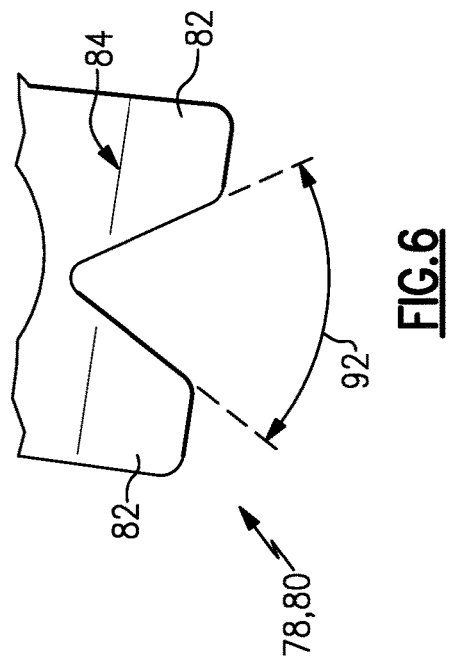
FIG. 6 is an enlarged view of an example tab set of the lock washer.

Referring to FIGS. 5, 6, and 7, the example lock washer 74 includes the openings 76 that are spaced apart a distance 72. The distance 72 corresponds to openings within the case structure 62. The washer 74 includes the first tab set 78 and the second tab set 80. Each of the tab sets 78, 80 include individual tabs 82 that are spaced apart from each other. The tab sets 80 also are disposed about a bend 84. The bend 84 is that point that is provided within each of the tab set 78 and 80 that facilitates bending a part of the corresponding tab 82.

Each of the tabs 82 for the tab sets 78 and 80 are spaced apart from each other and include an angled orientation relative to each other. In this example, each of the tabs 82 includes an angle 92 disposed there between. In a disclosed non-limiting dimensional example, the angle 92 is between 56 and 65 degrees. As appreciated, the specific angle 92 between the tabs 82 can be modified depending on application specific parameters. In this example, the angle 92 facilitates engagement with the bolts 66 and 68.

Each of the tabs 82 are further bent upwardly at an angle 94 from a bottom surface 98 and a top surface 96 in the washer 74. The bend of the tab 82 is facilitated at the bend line 84. The angle 94 relative to the top surface 96 and the bottom surface 98 of the washer 74 provides a space for a tool under tab 82 to bend the tab 82 to its closed or blocking condition. Furthermore, the bend 94 of the tab 82 is such that it does not interfere with rotation or threading engagement of the bolts 66, 68 during assembly.

Each of the tab sets 78, 80 is disposed at an angle relative to a back side 88 of the washer 74. The angle 86 is between the back side 88 and a side surface 90 of each of the tab sets 78 and 80. The angle 86 provides an error proofing function to prevent misalignment and assembly of the washer 74. In this example, the angle 86 is between 90 and 105 degrees. As appreciated other angles may be utilized for each of the tab sets 78 and 80. Moreover, in the example disclosed washer 74, each of the tab sets 78 and 80 are angled relative to the back surface 88 at a non-normal angle. The non-normal angle is one that is greater or less than 90 degrees.

Figure 8:
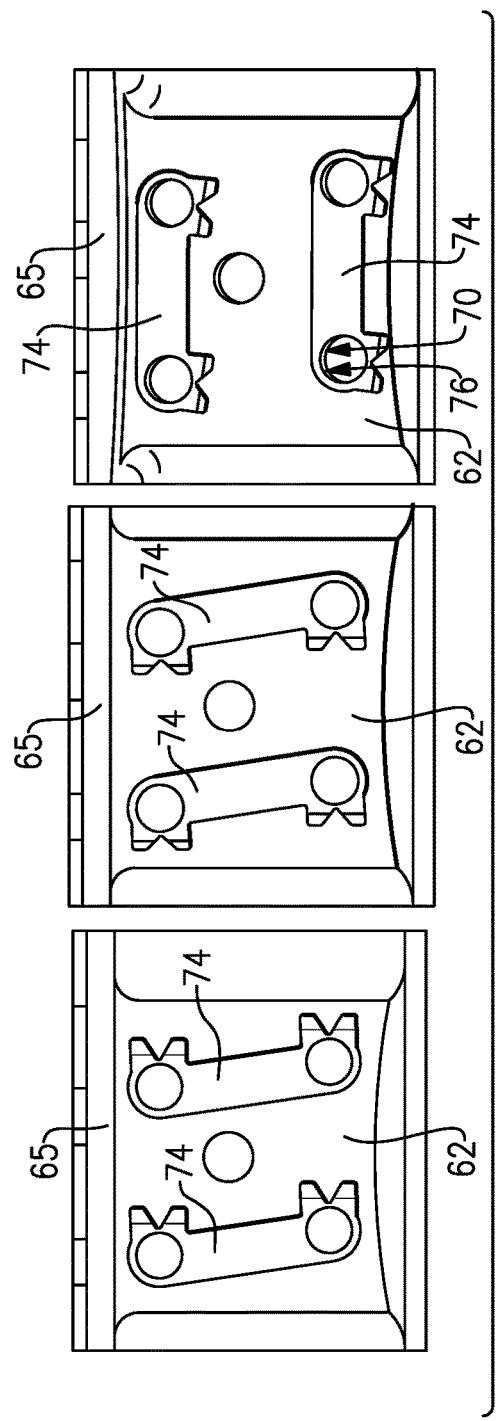
FIG. 8 is a view of alternate orientations of the example lock washer.

Referring to FIG. 8, several alternate orientations of the example washer 74 are illustrated. As appreciated, each of the washers 74 extends across at least two openings within the case 62. The example case 62 includes a flange 65 that is disposed proximate to openings 70. It is desired that the washer 74 be inserted in a specific orientation to provide access to the tabs 82 and prevents misalignment between the openings in the washer 74 and openings within the case 70.

Figure 10:
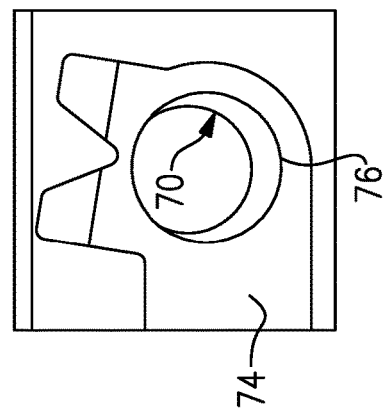
FIG. 10 is an enlarged view of a misaligned orientation of the example lock washer.
Figure 9:
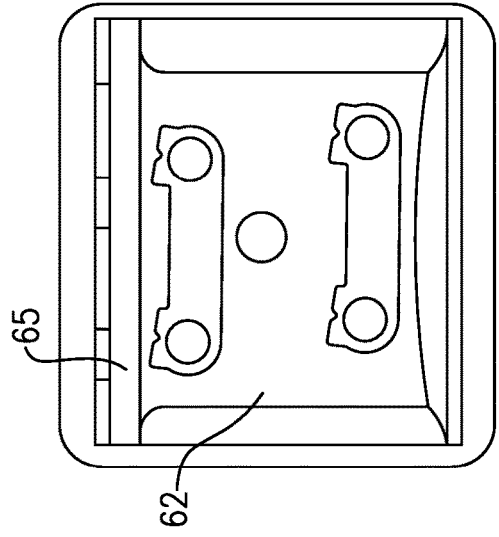
FIG. 9 is an example view of misaligned orientation of the example lock washer.

Referring to FIGS. 9 and 10, in one orientation of the washer 74, one of the tab sets 78 and 80 engages the flange 65 and cannot align properly with the opening 70 within the case 62. Accordingly, as is shown in FIG. 10, the orientation shown in FIG. 9 is prevented due to contact between the tab set 78 and the flange 65 that causes misalignment between the openings 70 and 76, thereby preventing assembly of the bolts 66, 68. Moreover, the misalignment prompts reorientation of the washer to one of the configurations shown in FIG. 8.

Accordingly, the example washer provides the self-anti-rotation feature while also locking the bolt and other fasteners 66, 68 in a desired lock and assembled position.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A lock washer comprising:
a first opening spaced apart from a second opening for receiving a corresponding first threaded fastener and a second threaded fastener and preventing rotation of the lock washer;
a first set of tabs associated with the first opening; and
a second set of tabs associated with the second opening, wherein the first set of tabs is bendable to a lock position preventing rotation of the first threaded fastener received within the first opening and the second set of tabs bendable to a lock position preventing rotation of the second threaded fastener received within the second opening, wherein each of the first set of tabs and the second set of tabs are disposed at a tab set angle that is greater that 90 degrees and less than 105 degrees from a back side opposite the first set of tabs and the second set of tabs.

2. The lock washer as recited in claim 1, wherein each of the first set of tabs and the second set of tabs comprise two tabs with a tab angle defined between the two tabs, the tab angle being between 56 and 65 degrees.

3. The lock washer as recited in claim 2, wherein the tab angle defines a notch disposed between the two tabs of the first set of tabs and the second set of tabs.

4. The lock washer as recited in claim 1, wherein the first set of tabs is parallel to the second set of tabs.

5. The lock washer as recited in claim 1, wherein in a first non-assembled condition each of the first set of tabs and the second set of tabs are angled upwardly relative to a top surface of the lock washer.

6. The lock washer as recited in claim 1, wherein each of the first set of tabs and the second set of tabs includes two tabs extending away from the corresponding one of the first opening and the second opening in a common direction.

7. The lock washer as recited in claim 6, wherein each of the two tabs of the first set of tabs and the second set of tabs includes a bend, with the bend on one of the two tabs aligned and parallel with the bend on the other of the two tabs.

8. A mid-turbine frame assembly comprising:
a case defining a first bolt hole and a second bolt hole spaced a first distance apart;
a tie rod secured relative to the case by a first bolt extending through the first bolt hole and a second bolt extending through the second bolt hole; and
a lock washer including a first opening for receiving a first bolt spaced and a second opening for receiving a second bolt, the first opening spaced apart from the first opening preventing rotation of the lock washer, a first set of tabs associated with the first opening, and a second set of tabs associated with the second opening, wherein the first set of tabs are bendable to a lock position preventing rotation of the first bolt received within the first opening and the second set of tabs are bendable to a lock position preventing rotation of the second bolt received within the second opening, wherein each of the first set of tabs and the second set of tabs are disposed at a tab set angle that is greater than 90 degrees and less than 105 degrees from a back side opposite the first set of tabs and the second set of tabs.

9. The mid-turbine frame assembly as recited in claim 8, wherein each of the first set of tabs and the second set of tabs comprise two tabs with a tab angle defined between the two tabs, the tab angle being between 56 and 65 degrees.

10. The mid-turbine frame assembly as recited in claim 9, wherein the tab angle defines a notch disposed between the two tabs of the first set of tabs and the second set of tabs.

11. The mid-turbine frame assembly as recited in claim 8, wherein the first set of tabs are parallel to the second set of tabs.

12. The mid-turbine frame assembly as recited in claim 8, wherein each of the first set of tabs and the second set of tabs are angled upwardly relative to a top surface of the lock washer.

13. The mid-turbine frame assembly as recited in claim 8, wherein the first and second bolt holes are disposed adjacent a flange of the case, wherein the lock washer includes an orientation wherein at least one of the first set of tabs and the second set of tabs engage the flange to mis-align one of the first and second openings with a corresponding one of the first and second bolt holes.

14. The mid-turbine frame assembly as recited in claim 8, wherein the engagement between the first bolt and the second bolt and the lock washer prevent rotation of the lock washer relative to the case.

15. The mid-turbine frame assembly as recited in claim 8, wherein each of the first set of tabs and the second set of tabs includes two tabs extending away from the corresponding one of the first opening and the second opening in a common direction.

16. The mid-turbine frame assembly as recited in claim 15, wherein each of the two tabs of the first set of tabs and the second set of tabs includes a bend, with the bend on one of the two tabs aligned and parallel with the bend on the other of the two tabs.

* * * * *